United States Patent

Shimotsuma et al.

[15] 3,635,085
[45] Jan. 18, 1972

[54] SYSTEM FOR DETECTING THE TEMPERATURE DISTRIBUTION OF A HEATED BODY

[72] Inventors: Teruo Shimotsuma; Toshihiro Mori; Kazuo Sano, all of Yokohama-shi; Seigo Ando, Kawasaki-shi, all of Japan

[73] Assignee: Nippon Kokan Kabushiki Kaisha, Tokyo, Japan

[22] Filed: June 11, 1969

[21] Appl. No.: 832,264

[30] Foreign Application Priority Data

June 15, 1968 Japan..................................43/41010

[52] U.S. Cl..........................73/340, 73/355 R, 250/83.3 HP
[51] Int. Cl..........................................G01d 5/40, G01j 5/32
[58] Field of Search.....................73/340, 355; 250/83.3 HP

[56] References Cited

UNITED STATES PATENTS

| | | | |
|---|---|---|---|
| 2,848,626 | 8/1958 | Brackmann | 73/355 X |
| 2,971,093 | 2/1961 | Garbuny | 250/83.3 HP |
| 3,430,045 | 2/1969 | Björk et al. | 73/355 X |

Primary Examiner—Louis R. Prince
Assistant Examiner—Frederick Shoon
Attorney—George B. Oujevolk

[57] ABSTRACT

A system for detecting the temperature distribution of a heated body which consists in receiving heat rays radiated from predetermined parts of heated body by an image pickup tube through an optical lens to focus a charged temperature distribution pattern image corresponding to the heat rays on the photoelectric plane of said tube, taking out an image signal pattern corresponding to the resultant charged temperature distribution pattern of the heated body at predetermined parts from output terminals of said tube dividing the image signal pattern into a plurality of portions in corresponding relationship to the desired number of divisions of an image screen, following up momentary temperature information as the displayed variable in the temperature distribution pattern for each such division, integrating the values of these momentary temperature information on the basis of a given time of determination to obtain a converted average value determined on a time basis and displaying on an image-receiving tube the resultant time-averaged temperature distribution pattern images corresponding to the temperature distribution pattern of the heated body at the predetermined parts.

5 Claims, 12 Drawing Figures

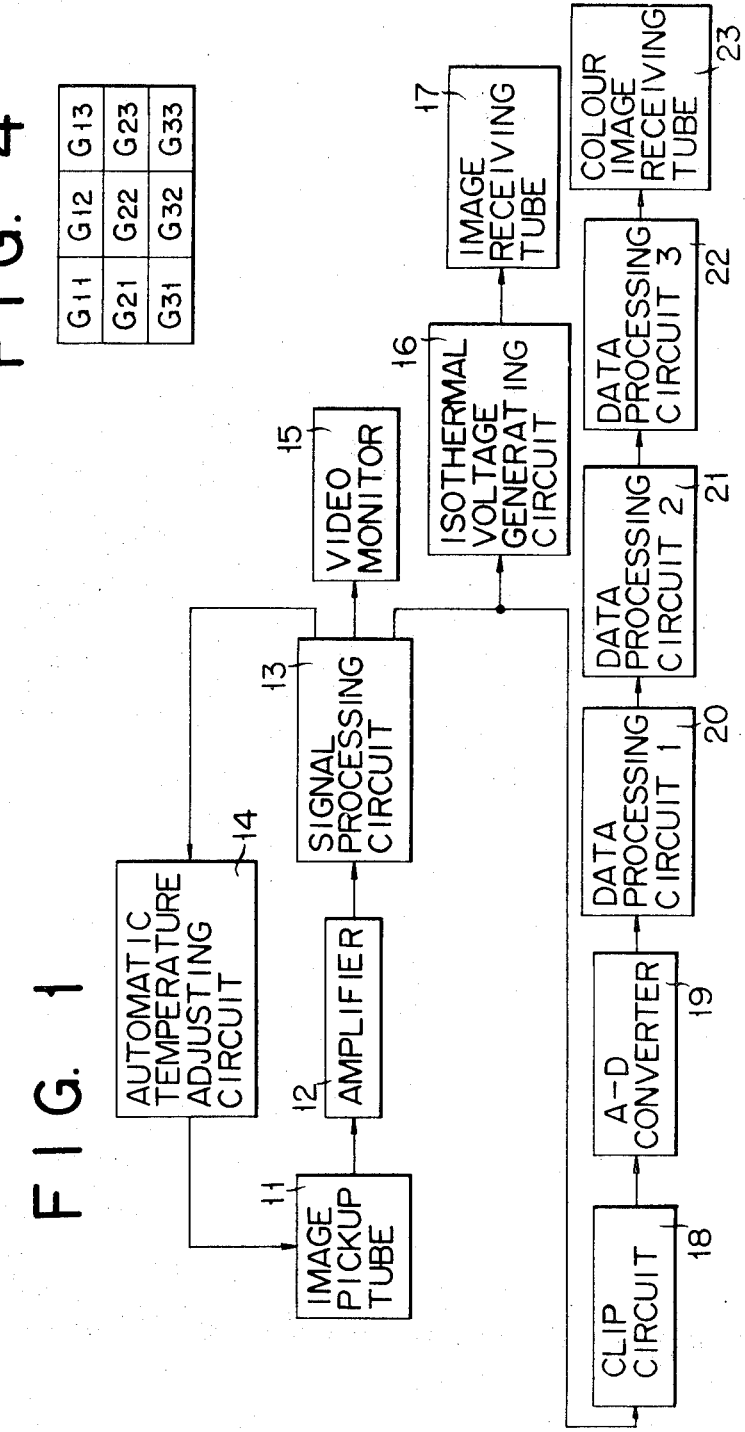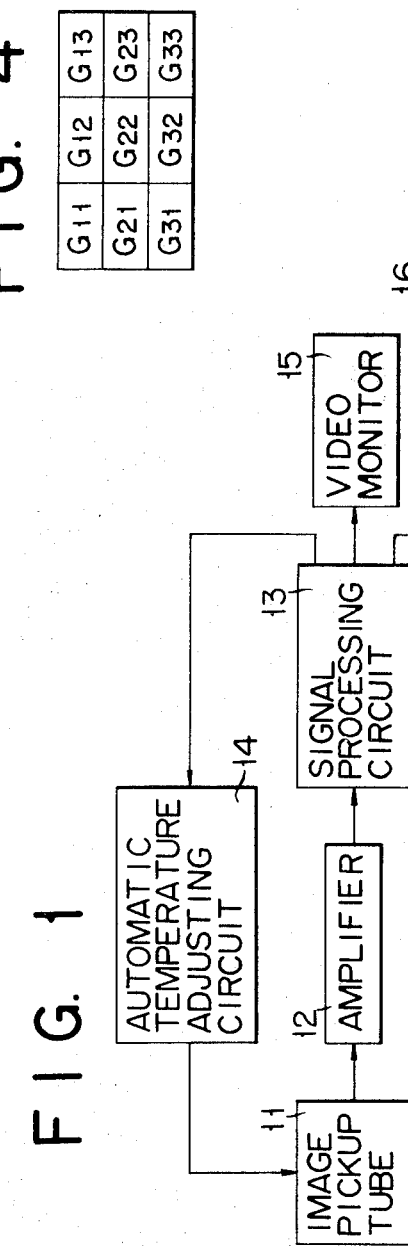

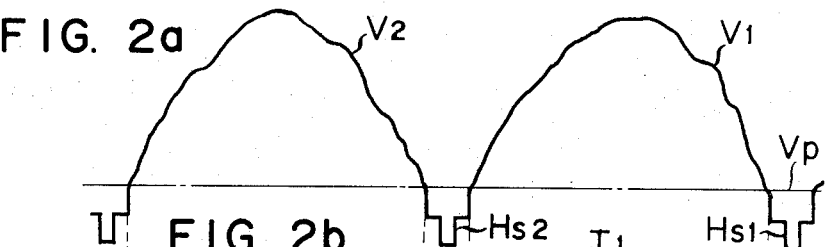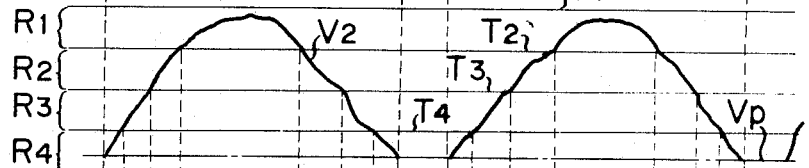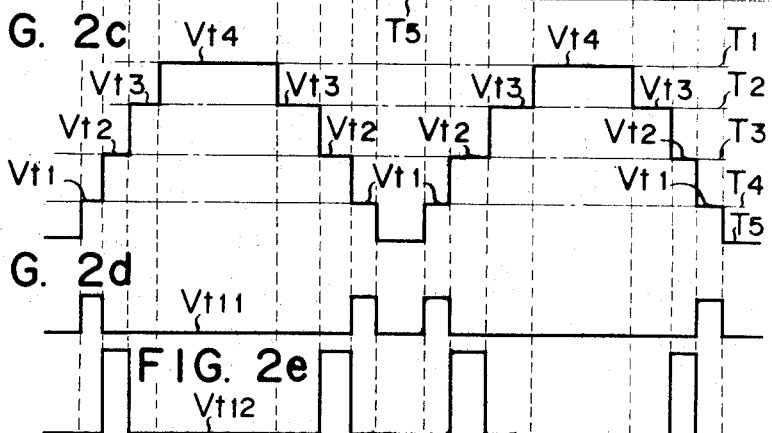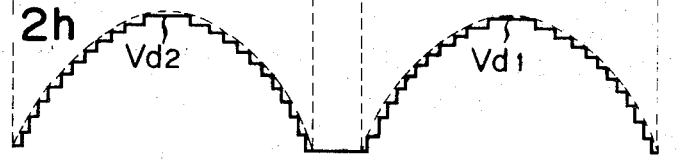

SYSTEM FOR DETECTING THE TEMPERATURE DISTRIBUTION OF A HEATED BODY

The present invention relates to a system for detecting the temperature distribution of a heated body and more particularly to a system suitable for detecting the temperature distribution pattern at the top portion of a blast furnace charge or rotary kiln using an infrared vidicon camera and controlling the blast furnace or rotary kiln operation so as to maintain optimum operating conditions.

For the convenience of explanation, but not in the sense of limiting the scope of the invention, there will be hereinafter described a system for detecting the temperature distribution pattern at the top portion or stock line of a blast furnace charge.

As is well known, it is of vital importance for blast furnace operation to obtain accurate information on the temperature distribution pattern at the furnace top so as to evaluate the furnace condition and quickly determine an optimum operating process so as to match this condition.

An accurate knowledge of the temperature distribution pattern at the furnace top makes it possible to maintain gas temperature there within a suitable range, which is, in turn, permitted to properly control heat exchange between hot gas rising upward through the furnace shaft and falling charged material (comprising ore and coke) and also to prevent the occurrence of abnormalities, such as ignition of hot gas when the temperature increases over a certain level and overheating at the furnace top. There is known, as a typical example, a system for detecting the temperature distribution pattern at the top portion or stock line of a blast furnace charge, wherein the temperature at several points in the periphery is determined through a thermocouple horizontally inserted into the furnace, in an amount reaching about 1 to 2 meters, from that part of the furnace wall which is positioned about 1 to 3 meters above the stock line. However, the furnace operation, when relying solely on the temperature information obtained from such several discontinuous points, requires skill of operation and thus it is almost impossible to keep the furnace in an optimum operating condition.

Another example of a system of this type has been developed which is an arrangement adapted to supply output video signals obtained by picking up the image of a pattern of heat rays radiated from the top portion of a blast furnace charge using an infrared vidicon camera connected to a conventional-type image pickup tube, so as to focus on the photoelectric plane of said image pickup tube momentary temperature distribution pattern images presented by the intensity of the brightness corresponding to the temperature distribution of a heated body.

However, such temperature distribution pattern images constitute only of analogous light and dark images and it is difficult to accurately detect the temperature distribution at the top portion of the furnace charge. Even if the temperature distribution at the top portion of the furnace charge could be accurately detected by the aforementioned temperature distribution pattern images, it is actually impossible to control the furnace at optimum conditions using the momentarily fluctuating analogous temperature distribution information, since the temperature distribution at the top portion of such furnace charge varies widely at every moment.

It is, therefore, an object of this invention to provide a system for detecting the temperature distribution of a heated body, which is so designed as to effectuate the detection by dividing the temperature distribution pattern of the heated body at predetermined parts into a plurality of isothermal division areas.

Another object of this invention is to provide a system for detecting the temperature distribution of a heated body, which is so designed as to make the detection by integrating the momentary temperature distribution pattern of the heated body at predetermined parts on the basis of a given time of determination, converting the integrated temperature distribution pattern into a time-averaged value determined on said time basis and dividing the time-averaged temperature distribution pattern into a plurality of isothermal division areas.

A further object of this invention is to provide a system for detecting the temperature distribution of a heated body, which is so designed as to make the detection by dividing such momentary and/or time-averaged temperature distribution pattern of the heated body at predetermined parts into a plurality of isothermal temperature division zones and displaying them on a color image receiving tube, in various hues of colors, the separate temperature distribution pattern portions surrounded by said isothermal temperature division zones respectively. Therefore, when the present inventive concept is utilized for detection of the temperature distribution at prescribed parts of a heated body such as the piled layer of ore and coke in a blast furnace and cement in a rotary kiln, it is possible to constantly control the optimum operating conditions of the furnace readily.

The present invention can be more fully understood from the following detailed description when taken in connection with reference to the accompanying drawings, in which:

FIG. 1 is a schematic block diagram of a system for detecting the temperature distribution of a heated body according to an embodiment of the present invention;

FIG. 2a to 2h are waveforms illustrative of the concrete operation of the various parts of the circuit shown in FIG. 1;

FIG. 4 shows the divided portions of an image screen according to the aforesaid embodiment.

Figure 3:
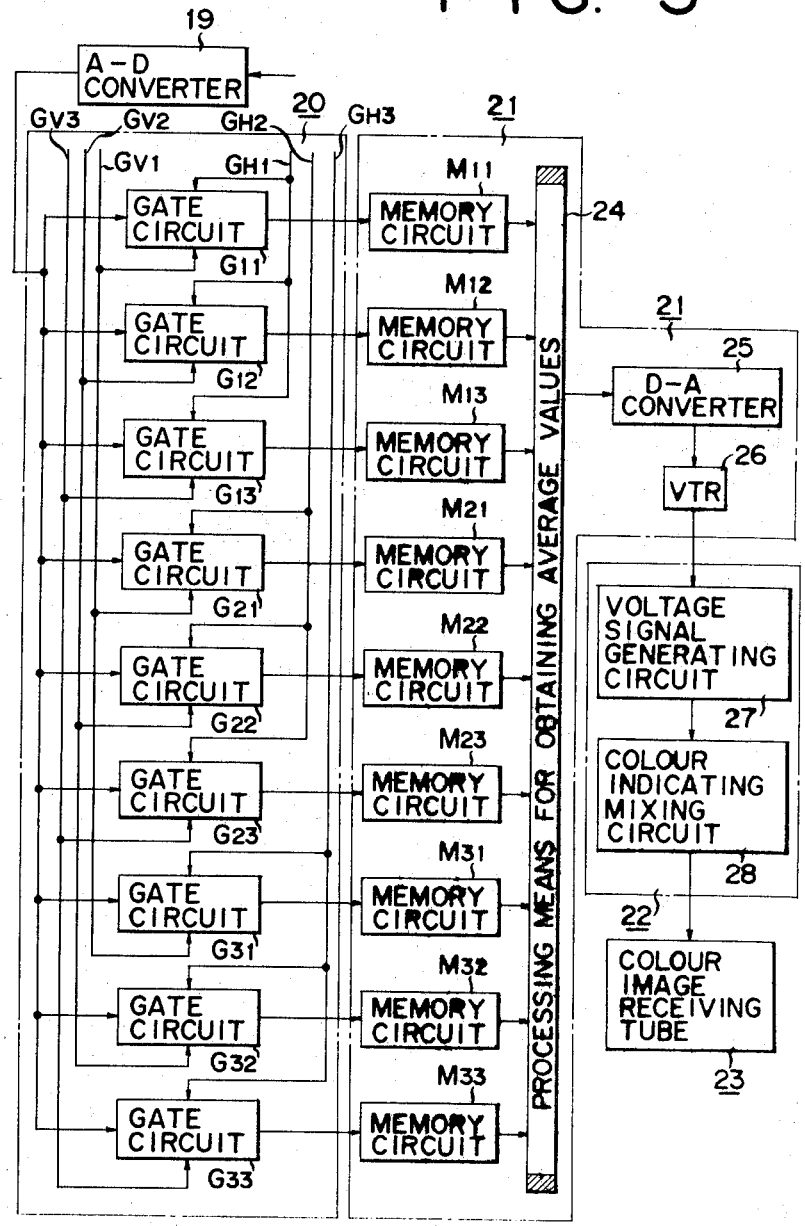
FIG. 3 is a detailed circuit diagram of a system for indicating the average value of the respective isothermal lines which constitutes the main part of an apparatus shown in FIG. 1.

Referring to FIG. 1, numeral 11 denotes an image pickup tube device, for example, an infrared vidicon camera which is so designed as to receive heat rays radiated from predetermined parts of a heated foreground subject, for example, a stock line at the top of a blast furnace, iron wall of said furnace, rotary kiln or various electrical apparatuses and lead out an image signal corresponding to a temperature distribution pattern associated with said heat rays. Image signals $V_1$, $V_2$ ... corresponding to charged image patterns (not shown) appearing on the photoelectric plane of the vidicon as shown in FIG. 2a are interposed between the horizontal synchronizing signals $H_{s1}$, $H_{s2}$ ... included in raster scanning and derived from the vidicon 11. The image signals $V_1$, $V_2$ ... from the vidicon 11 including the horizontal synchronizing signals $H_{s1}$, $H_{s2}$ ... are conducted to a signal-processing circuit 13 through an amplifier 12 forming a color control unit. Said processing circuit 13 is intended to cut signals at a suitable level $V_p$ adapted to eliminate the horizontal synchronizing signals $H_{s1}$, $H_{s2}$ ...... . From said circuits 13 are derived only image signals $V_1$, $V_2$ ... as shown in FIG. 2b which correspond to the desired temperature distribution pattern. Numeral 14 denotes an automatic temperature-adjusting circuit provided, if necessary, to control the vidicon 11 by negative feedback. This circuit 14 normally or intermittently detects the pedestal level $V_p$ of outputs, for example, from the signal-processing circuit 13 so as to keep the image pickup effect of the vidicon constantly stable.

Output image signals $V_1$, $V_2$ ... from the signal-processing circuit 13 are supplied to a video monitor 15 directly to be reproduced as black and white infrared images and also to an isothermal voltage-generating circuit 16. This circuit 16 divides the temperature distribution of a heated foreground subject into a plurality of temperature zones as $R_1$, $R_2$, $R_3$ and $R_4$ of FIG. 2b, if the level of the image signal (not shown), for example, well accords with said temperature distribution. Thus there is formed a composite isothermal voltage signal $V_t$ of stepped waveform comprising, as shown in FIG. 2c, a plurality of isothermal voltage signals $V_{t1}$, $V_{t2}$, $V_{t3}$ and $V_{t4}$ having different voltage levels, by the use of a plurality of Schmidt circuits which have set a plurality of isothermal voltage levels $T_1$, $T_2$, $T_3$, $T_4$ and $T_5$ corresponding to the border portions of the aforesaid divided temperature zones $R_1$, $R_2$, $R_3$ and $R_4$, for example, at their threshold values. If it is desired to take out any given isothermal voltage signal, for example, $V_{t3}$, it is differentially detected by subtracting other signals, i.e., $V_{t4}$, $V_{t2}$, and $V_{t1}$ from the entire composite voltage signal pattern $V_t$. Thus there is obtained an isothermal image signal pattern consisting of a plurality of isothermal voltage signals $V_{t11}$, $V_{t12}$, $V_{t13}$ and $V_{t14}$ as shown in FIGS. 2d to 2g. This signal pattern is displayed in high brightness on the photoelectric plane of an image-receiving tube 17 as the temperature distribution pattern image of the heated foreground subject at the predetermined parts. If, in this case, portions interposed between the isothermal temperature zones, that is, $T_1$ and $T_2$, $T_2$ and $T_3$, $T_3$ and $T_4$, and $T_4$ and $T_5$ are displayed on a color television image-receiving tube in separate distinct hues there will be obtained an extremely great effect in exhibiting a temperature distribution pattern.

As a further step of detecting the temperature distribution pattern of the heated foreground subject at predetermined parts by a process of obtaining time-averaged values for which the present invention is primarily intended as mentioned above, image signals $V_1$, $V_2$ ....., as shown in FIG. 2b, obtained from the signal-processing circuit 13 are supplied to a clip circuit 18, provided, if required, to cut off unnecessary portions of voltage waveforms and then subjected to conversion by an A/D conversion circuit 19 to form image signals $V_{d1}$, $V_{d2}$ ... according to digital indication as shown in FIG. 2h. Thereafter, output image signals $V_{d1}$, $V_{d2}$ ... from said A/D conversion circuit 19 pass, as further described below, through data-processing means 1 to 3 (20 to 22) in turn and are conducted to a means consisting of a color television image-receiving tube 23 for distinguishing time-averaged temperature distribution over the particular temperature zone, for each of the separate zones, either during a single scan or over a longer period of time, i.e., the tube distinguishes the pattern images formed by a plurality of isothermal voltages of different hues FIG. 3 is a detailed representation of data-processing means 1 to 3 (20 to 22). The image signals $V_{d1}$, $V_{d2}$ ... subjected to A/D conversion by the A/D conversion circuit 19 are supplied, for example, to nine gate circuits $G_{11}$, $G_{12}$, $G_{13}$, $G_{21}$, $G_{22}$, $G_{23}$, $G_{31}$, $G_{32}$ and $G_{33}$. constituting the data-processing means 1 (20). These gate circuits $G_{11}$ to $G_{33}$ correspond to the nine divisions of an image pickup screen of said image-receiving tube 23, as shown in FIG. 4. The image signal components corresponding to said divisions are selectively controlled by gate signals $GH_1$, $GH_2$ and $GH_3$ acting in a horizontal direction and other gate signals $GV_1$, $GV_2$ and $GV_3$ acting in a vertical direction. Here the number of divisions is set at nine, but it is possible to divide the image pickup screen into any desired number of divisions depending on the required accuracy of determination and processing method for obtaining required time-averaged values.

Figure 5:
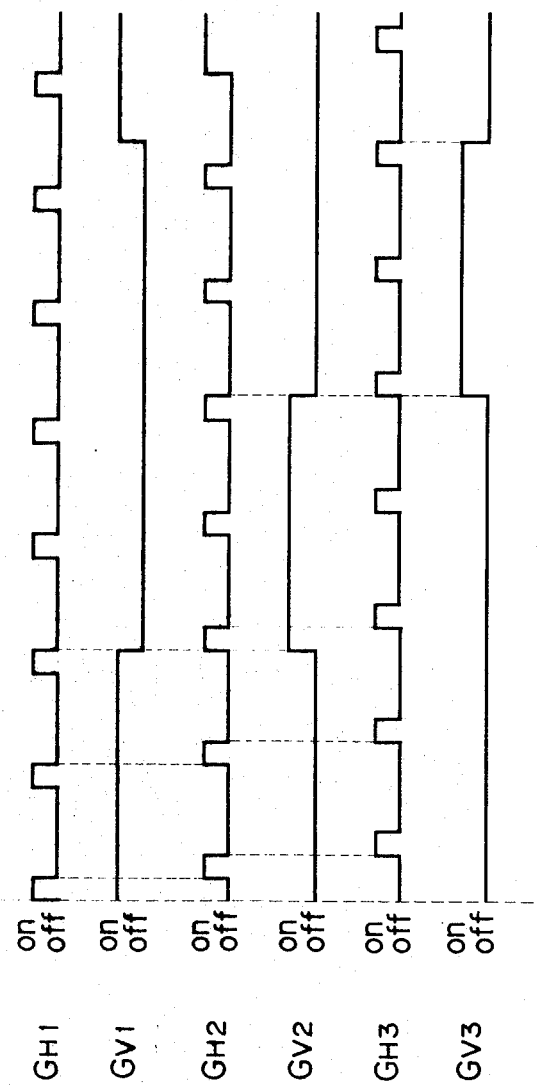
FIG. 5 presents the waveforms of signals for divising said image screen.

If the gate signals $GH_1$ to $GH_3$ and $GV_1$ to $GV_3$ supplied to the gate circuits $G_{11}$ to $G_{33}$ respectively are so set as to have time-divided waveforms as shown in FIG. 5, then there will be taken out from the gate circuits $G_{11}$ to $G_{33}$ signals corresponding to the divisions of the image pickup screen as shown in FIG. 4, and then temporarily stored in the memory circuits 1 to 9 ($M_{11}$ to $M_{33}$) constituting the data-processing means 2 (21). The signals from the memory circuits ($M_{11}$ to $M_{33}$) are integrated on the basis of a given time of determination by a processing means 24 for obtaining time-averaged temperature distribution pattern image signals which consists of a counter or the like using, for example, a plurality of R - S flip-flop circuits, and taken out in the resultant temperature distribution pattern video signals having time-averaged values determined on such time basis. Said signals are further subjected, if required, to a digital to analog conversion by a separate D/A converter 25 to form image signals denoting the temperature distribution pattern of the heated foreground subject at the predetermined parts. The signals from this D/A converter 25 represent the image signals of said pattern obtained by averaging their momentary values on the basis of a suitably chosen time. If said image signals are stored in a video tape recorder 26 (hereinafter referred to as the VTR), then there will be obtained great convenience in later reproducing and studying a temperature distribution pattern bearing values averaged over a long period.

The data-processing means 3 (22) comprises an isothermal voltage signal generating circuit 27 for supplying image signals stored in the VTR 26. Where the levels of image signals from the data processing means 2 (21) which represent such time-averaged temperature distribution pattern well accord with the determined values of temperatures of the heated foreground subject at its prescribed parts, then the aforesaid isothermal voltage signal generating circuit 27 is operated by approximately the same arrangement as the isothermal voltage-generating circuit 16 of FIG. 1, namely, produces different time-averaged temperature distribution pattern video signals surrounded by a plurality of averaged isothermal voltages corresponding to a plurality of isothermal temperature zones averaged on the basis of a suitably chosen time, and as a result there is formed an image signal pattern of isothermal voltages averaged on such time basis approximately as in the case of FIGS. 2d to 2g. Output image signals from said voltage signal generating circuit 27 are converted into color television image signals in which, for example, the respective time-averaged temperature distribution pattern images, the portions interposed between adjacent isothermal voltages are distinguished in separate hues by a color-indicating mixing circuit 28 formed of the known matrix circuit. Thus on the photoelectric plane of the color television image-receiving tube 23 there is displayed the resultant time-averaged temperature distribution pattern image in separate image formed by a plurality of separate isothermal areas and hues. For example, where the temperature range of the foreground subject to be detected is divided into nine parts, the first, fourth and seventh temperature zones as counted from the lowest zone are indicated in hues bearing three primary colors of blue, green and red. And the other zones, i.e., second, third, fifth, sixth, eighth, and ninth are displayed in hues bearing any two out of the three primary colors of blue, green and red combined in suitable proportion. Accordingly, the pattern formed a plurality of separate isothermal areas displayed on the photoelectric plane of the color television receiving tube 23 actual time-averaged temperature distribution pattern formed by a plurality of separate isothermal zones of a foreground subject is displayed on a color television receiving tube 23 as brightness and hue pattern images.

Referring to the operating time required for signals to enter the VTR 26, the memory circuit 21 is continuously supplied with information, so that there occurs a dead time for each cycle of computing average values. However, such dead time is of a negligible order with respect to a given time of integration and also checked by a monitor of momentary patterns, so that there is not raised any problem in connection with said dead time. For complete elimination of the dead time, it will be advisable to provide another group of memory circuits in parallel relationship to the original one, and use both groups by turns.

As mentioned above, the present invention enables the temperature distribution pattern of a heated foreground subject at the predetermined parts to be indicated in values averaged on the basis of a given time of determination and formed plurality of separate isothermal zones to be displayed in the form of their time-averaged values, and moreover the entire temperature distribution pattern characteristics of said subject to be detected quite distinctly and truthfully. Further, since the values of momentary changes in the temperature distribution pattern of the foreground subject at said predetermined parts can be checked by a monitor, such changes can be compared with the time-averaged temperature distribution pattern obtained by the method of the present invention. Thus comparison of said momentary, averaged and desired temperature distribution patterns permits easy temperature control. Further when the values of momentary temperature changes are followed up, the data-processing means are already on line, so that a temperature distribution pattern representing values averaged over a given period can also be immediately detected at any desired time.

Since the method of the present invention for detecting an averaged temperature distribution pattern is a noncontact type, it is effective in indicating the temperature distribution pattern of, for example, a stock line at the top of a blast furnace and also capable of displaying the surface temperature of the iron wall of a blast furnace or rotary kiln and the temperature distribution pattern in the interior of various electrical apparatuses far more exactly than has been possible with the prior art method, thus offering exceeding great industrial advantage.

What we claim is:

1. A system for detecting the temperature distribution pattern of a heated body which comprises:
   a. an infrared image pickup tube for receiving heat rays radiated from predetermined parts of the heated body through an optical lens to focus temperature distribution pattern images corresponding to the radiated heat rays on the photoelectric plane of said tube and thereby deriving from said tube output terminals image signal patterns corresponding to said temperature distribution pattern images;
   b. an isothermal voltage signal generating circuit converting the output image signal patterns from said tube into a plurality of isothermal voltage signals divided by a plurality of separate isothermal division areas; and,
   c. an image-receiving tube for receiving the divided isothermal voltage signals from said isothermal voltage signal generating circuit and displaying on the image screen thereof the resultant temperature distribution pattern images, which differs in brightness or hue in response to said respective isothermal division areas, of said heated body at said predetermined parts.

2. The system according to claim 1, wherein said isothermal voltage signal generating circuit comprises a plurality of Schmidt circuits set at a plurality of isothermal voltage trigger levels.

3. A system for detecting the temperature distribution pattern of a heated body which comprises:
   a. an infrared image pickup tube for receiving heat rays radiated from predetermined parts of the heated body through an optical lens to focus temperature distribution pattern images corresponding to the heat rays on the photoelectric plane of said tube and thereby deriving from said tube output terminals image signal patterns corresponding to said temperature distribution pattern images;
   b. a division circuit including means for dividing the output image signal pattern from said tube into a plurality of portions in corresponding isothermal relationship to the desired number of division areas on an image screen and thereby detecting momentary temperature information as the displayed variable for each such division area;
   c. a time-temperature integration circuit including means for integrating the divided temperature distribution signal patterns of the momentary temperature information as the displayed variable from said division circuit on the basis of a given time of determination to obtain the time-averaged value of said momentary temperature information as the displayed variable;
   d. an isothermal voltage signal generating circuit converting the divided temperature distribution signal pattern averaged on said time basis from said integration circuit into a plurality of isothermal voltage signals divided by a plurality of separate isothermal temperature zones; and,
   e. an image-receiving tube for receiving the divided isothermal voltage signals averaged on said time basis from said isothermal voltage signal generating circuit and thereby displaying on the image screen thereof the resultant average temperature distribution pattern images, which differ in brightness or hue in response to said respective isothermal temperature zones, of said heated body at said predetermined parts.

4. The system according to claim 3, wherein said isothermal voltage signal generating circuit comprises a plurality of Schmidt circuits set at a plurality of isothermal voltage trigger levels.

5. The system according to claim 3, wherein said integration circuit comprises a plurality of flip-flop circuits.

* * * * *